(12) United States Patent
Malwankar et al.

(10) Patent No.: US 9,727,456 B2
(45) Date of Patent: Aug. 8, 2017

(54) SCHEDULED GARBAGE COLLECTION FOR SOLID STATE STORAGE DEVICES

(71) Applicant: Pavilion Data Systems, Inc., Sunnyvale, CA (US)

(72) Inventors: Kiron Balkrishna Malwankar, Saratoga, CA (US); Raghuraman Govindasamy, San Jose, CA (US); Dan M. Melnic, Los Gatos, CA (US)

(73) Assignee: Pavilion Data Systems, Inc., Sunnyvale, CA (US)

( * ) Notice: Subject to any disclaimer, the term of this patent is extended or adjusted under 35 U.S.C. 154(b) by 182 days.

(21) Appl. No.: 14/531,795

(22) Filed: Nov. 3, 2014

(65) Prior Publication Data

US 2016/0124847 A1 May 5, 2016

(51) Int. Cl.
*G06F 12/00* (2006.01)
*G06F 12/02* (2006.01)
*G06F 9/00* (2006.01)

(52) U.S. Cl.
CPC ............ *G06F 12/0253* (2013.01); *G06F 9/00* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 2009/0083483 A1* | 3/2009 | Balakrishnan | ...... | G06F 11/1076 711/114 |
| 2009/0319720 A1* | 12/2009 | Stefanus | ............ | G06F 12/0246 711/103 |
| 2012/0036309 A1* | 2/2012 | Dillow | .................. | G06F 11/108 711/103 |
| 2013/0111153 A1* | 5/2013 | Lee | ......................... | G06F 3/067 711/154 |
| 2014/0281338 A1* | 9/2014 | Choi | ................... | G06F 12/0269 711/170 |
| 2014/0372698 A1* | 12/2014 | Lee | ........................... | G06F 3/06 711/114 |
| 2016/0070593 A1* | 3/2016 | Harris | ................... | G06F 9/4843 718/106 |
| 2016/0179403 A1* | 6/2016 | Kurotsuchi | ............ | G06F 3/0617 711/114 |

OTHER PUBLICATIONS

Information Technology—SCSI Primary Commands-4 (SPC-4), Revision 31, Jun. 13, 2011.*

* cited by examiner

*Primary Examiner* — Prasith Thammavong
*Assistant Examiner* — Jason Blust
(74) *Attorney, Agent, or Firm* — Lowenstein Sandler LLP

(57) ABSTRACT

A processing device identifies a plurality of solid state storage devices arranged in an array and determines, for at least one solid state storage device of the plurality of solid state storage devices, a first time window during which the at least one solid state storage device is permitted to perform one or more garbage collection operations. The processing device then sends, to the at least one solid state storage device, a message comprising the first time window allocated to the at least one storage device, wherein the at least one solid state storage device is to perform the garbage collection operations during the first time window allocated to the at least one solid state storage device.

21 Claims, 8 Drawing Sheets

SCHEDULED GARBAGE COLLECTION FOR SOLID STATE STORAGE DEVICES

FIELD OF TECHNOLOGY

This disclosure relates generally to the field of date storage and in particular to garbage collection for solid state storage devices.

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. However, solid state storage devices periodically enter into a garbage collection mode during which the solid state storage devices are unavailable for read and write operations. For current solid state storage device technologies, each solid state storage device independently determines when to enter the garbage collection mode. Thus, at any time one or more storage devices in an array may become momentarily unavailable for the duration of garbage collection operations performed during the garbage collection mode. This introduces occasional and unpredictable lag for read and write operations to a networked storage array of solid state storage devices.

BRIEF DESCRIPTION OF THE DRAWINGS

The embodiments described herein will be understood more fully from the detailed description given below and from the accompanying drawings.

DETAILED DESCRIPTION

Described herein are a system and method for managing garbage collection operations of solid state storage devices by a remote device. In described embodiments, a manager has a view of multiple solid state storage devices arranged in an array and creates a garbage collection schedule for the array of solid state storage devices. Each storage device is assigned a particular time window in which to perform garbage collection. This enables data stored in the array to be accessible at any time, even when a storage device is undergoing garbage collection operations. As a result, lag times exhibited for read and write commands due to solid state storage devices performing garbage collection are minimized and/or completely eliminated.

In one embodiment, a processing device identifies multiple solid state storage devices arranged in an array. The processing device determines, for at least one of the solid state storage devices, a first time window during which that solid state storage device is permitted to perform one or more garbage collection operations. The processing device then sends a message including the first time window to the storage device. The solid state storage device performs the garbage collection operations during the first time window allocated to the solid state storage device. The processing device may similarly determine time windows for other solid state storage devices arranged in the array with the solid state storage device, and may send those time windows to the appropriate solid state storage devices. Thus, garbage collection operations of solid state storage devices can be carefully controlled by a device such as an array manager.

Figure 1:
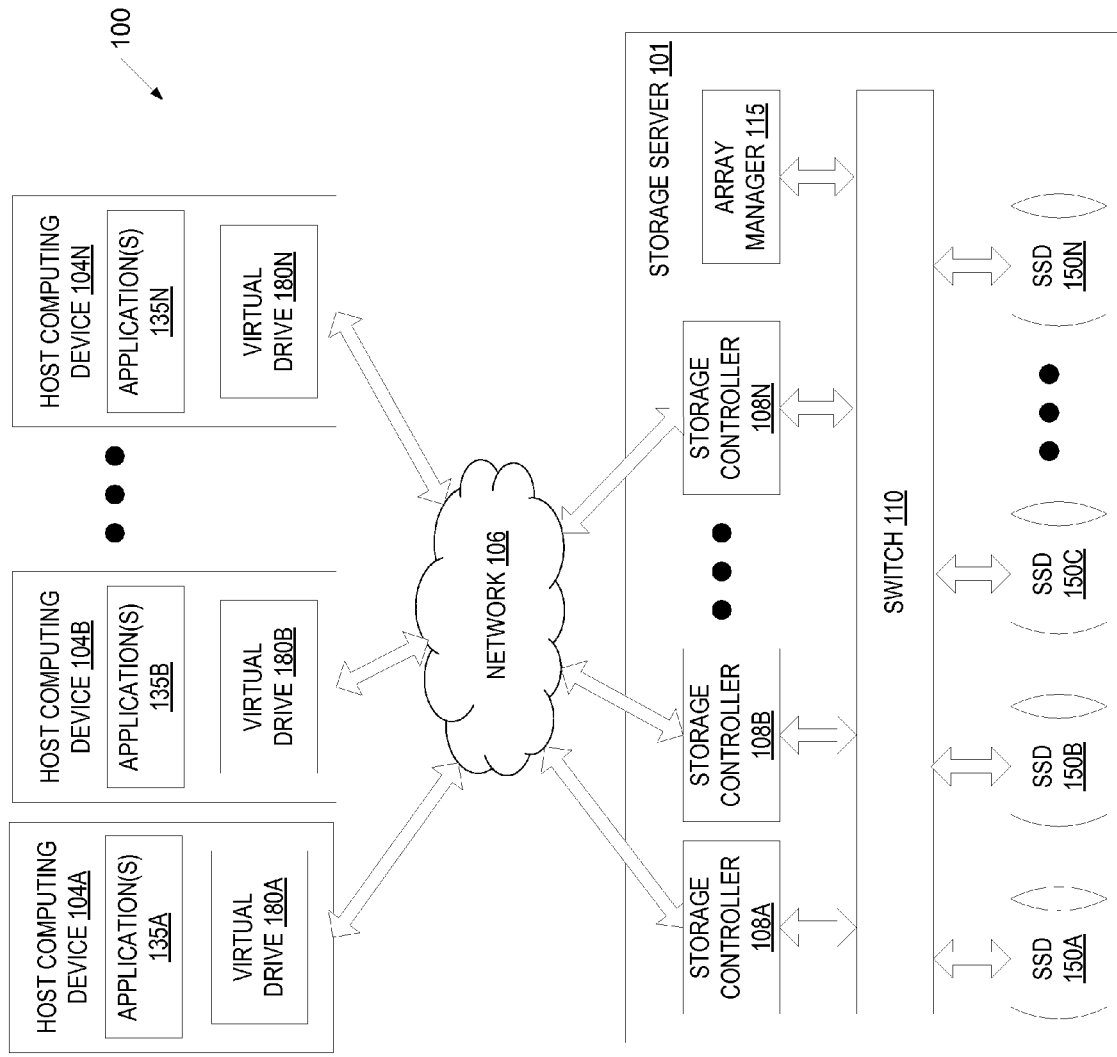
FIG. 1 is a block diagram example of a network architecture, in which embodiments described herein may operate.

FIG. 1 is a block diagram example of a network architecture 100, in which embodiments described herein may operate. The network architecture 100 may include a one or more host computing devices (e.g., host computing devices 104A, 104B through 104N) connected to a storage server 101 via a network 106. Network 106 may be a wide area network (WAN) such as the Internet, a local area network (LAN), a storage area network (SAN) or a combination thereof. The host computing devices 104A-N and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-N). Storage server 101 may be configured as a storage area network (SAN), network attached storage (NAS), or other remote storage type. Though a single storage server 101 is shown, the host computing devices 104A-N may connect to multiple storage servers. The multiple storage servers may be arranged in a cluster or other configuration.

Storage server 101 includes multiple storage controllers 108A, 108B through 108N connected to multiple solid state drives (SSDs) 150A, 150B, 150C through 150N via a switch 110. The SSDs 150A-N may be SAS/SATA drives, non-volatile memory express (NVMe) drives, SOP drives, or solid state drives that communicate using different protocols. The number of SSDs included in storage server 101 may be less than 10 to more than 100. The solid state drives may have the same or different storage capacities.

Each storage controller 108A-N is a device configured to connect one or more host computing devices 104A-N to one or more SSDs 150A-N. Each storage controller 108A-N includes one or more network interface controllers (NICs) such as Ethernet NICs and/or other protocol adapters (e.g., such as FC, SAS/SATA, or Infiniband (IB) adapters) that connect that storage controller to network 106. Each storage controller 108A-N additionally includes a port that connects to switch 110 via an internal bus. In one embodiment, storage controllers 108A-N include peripheral component interconnect express (PCIe) ports that connect to switch 110 via a PCIe bus. Alternatively, or additionally, storage controllers 108A-N may include small computer system interface (SCSI) ports, serial attached SCSI (SAS) ports, serial ATA (SATA) ports, Fibre Channel ports, or universal serial bus (USB) ports or other ports for connecting to the switch 110. Storage controllers 108A-N may additionally include a volatile and/or non-volatile memory to store firmware and/or software for performing operations described herein. Volatile memory may also be used for a data cache (e.g., as a write cache and/or a read look ahead cache). For example, storage controllers 108A-N may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

Storage controllers 108A-N may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each storage controller 108A-N is a system on a chip (SoC) including a processing device, a memory, one or more NICs and one or more internal ports.

Each storage controller 108A-N is assigned to one or more host computing devices 104A-N, and handles input/output (I/O) commands for those host computing devices. Applications running on a host computing device 104A-N may attempt to read data from and/or write data to a virtual drive that the host computing device has access to. Responsive to such a read or write request, the host computing device sends a read or write command to the storage controller 108A-N that is assigned to that host computing device 104A-N. When the storage controller 108A-N receives the read or write command from the host computing device 104A-N, the storage controller 108A-N determines what logical addresses of the virtual drive 180A-N should be used to write the data to or read the data from. The storage controller 108A-N additionally translates the logical addresses of the virtual drive to physical addresses of the SSDs 150A-N. For example, if a read command was received, the storage controller 108A-N determines which SSDs 150A-N store the information to be read as well as which physical addresses on those SSDs the data should be read from. In another example, if a write command was received, the storage controller 108A-N determines which SSDs 150A-N to write portions of received data to as well as which physical addresses of those SSDs 150A-N to write the data to.

Storage controllers 108A-N may additionally include array configuration information for the SSDs 150A-N that may be used to reconstruct data of one or more virtual drives 180A-N if one or more of the SSDs 150A-N becomes unavailable. If a read command is received while one or more SSDs 150A-N are unavailable, a storage controller may retrieve data from the available SSDs and then reconstruct missing data that is stored by the unavailable SSD (or unavailable SSDs) from the retrieved data. Storage controller 108A-N may then satisfy the read command using the reconstructed data.

Switch 110 is a multi-port bridge that connects storage controllers 108A-N to SSDs 150A-N. Switch 110 manages the flow of data within storage server 101 by connecting specific storage controllers 108A-N to specific SSDs 150A-N on a message by message basis, allowing the switch 110 to regulate the flow of traffic. Each storage controller 108A-N and each SSD 150A-N connected to switch 110 can be identified using a unique address (e.g., a unique port address) of the storage controller or SSD. Switch 110 may be a PCIe switch, an Ethernet switch, a SAS or SATA expander, a USB switch, or other type of switch.

Each solid state drive (SSD) 150A-N (also referred to as a solid state storage device) is a non-volatile storage device that uses integrated circuits to persistently store data. SSDs 150A-N have numerous advantages over traditional disk drives. As compared to disk drives, SSDs are more resilient, consume less power, and have lower latency (access times). In one embodiment, SSDs 150A-N are NAND-based Flash memory devices or NOR-based Flash memory devices. Flash memory devices are non-volatile and can be electronically erased and reprogrammed. Alternatively, one or more SSDs 150A-N may be volatile memory-based solid state drives (e.g., dynamic random access memory (DRAM)-based SSDs) that have a battery backup. SSDs 150A-N may include one or more ports to connect to switch 110. SSDs 150A-N may connect to switch 110 via PCIe, SCSI, SAS, USB, or other connection protocols.

Each SSD 150A-N has a controller and a storage area that includes memory (e.g., NAND Flash non-volatile memory) to store data. The storage area is divided into memory pages, which is the smallest unit of storage to which data may be stored. Memory pages may have sizes based on a configuration of an SSD. For example, SSDs 150A-N may have memory pages that are 8 kilobytes (kB) or 16 kB. However, other memory page sizes are also possible. Memory pages are grouped into blocks. Each block contains a particular number of memory pages, which is again dependent on a design of a particular SSD. Typical SSDs have blocks that include 256 memory pages.

For SSDs such as Flash SSDs, to write over the contents of a memory page, that memory page must first be erased. However, SSDs such as Hash SSDs have asymmetric write and erase capabilities. In particular, for Flash memory devices reads and writes are performed on individual memory pages. However, erase operations are not performed on individual memory pages. Instead, erase operations are performed on entire blocks. Accordingly, rather than re-writing over a given memory page when contents of that memory page are changed, that specific memory page is marked as invalid and the changed data is written to a new memory page.

In order to reuse the invalid memory pages, the SSDs 150A-N occasionally perform garbage collection. To perform garbage collection, an SSD may enter into a garbage collection mode and perform one or more garbage collection operations. Garbage collection operations may include first determining which blocks have a number of invalid memory pages that exceeds a threshold. For such blocks that have numerous invalid memory pages, the contents of valid memory pages from the blocks are copied to memory pages in other blocks. Once this is completed, all of the memory pages in those blocks having the numerous invalid memory pages are erased. The memory pages in those blocks may then be written to again.

For solid state storage devices such as Flash SSDs, erase operations typically take significantly more time to complete than either read or write operations. For example, for current Flash SSDs read operations are typically completed in tens to hundreds of microseconds (e.g., about 50-90 microseconds) and write operations are typically completed in about 1-2 milliseconds (ms). However, erase operations are typically performed in around 10 milliseconds. As a result, garbage collection operations are typically completed in a time frame that is significantly greater than the time frame for read and write operations. If a read or write operation is requested while one or more SSDs 150A-N are in garbage collection mode, a requestor typically waits until the garbage collection is complete before the read or write command is satisfied. This can introduce significant lag. Embodiments described herein minimize or eliminate such lag through the use of scheduled garbage collection for an array of SSDs, as discussed in detail below.

Storage server 101 additionally includes an array manager 115. Array manager 115 may be a device configured to perform particular operations with regards to management of the array of SSDs 150A-N. Array manager 115 may include a processing device and a port for connecting to switch 110. Array manager 115 may additionally include a volatile and/or non-volatile memory to store firmware and/or software for performing operations described herein. In one embodiment, array manager 115 is a SoC.

The array manager 115 determines how to configure the array of SSDs 150A-N and further determines configurations for the one or more virtual drives 180A-N. For example, array manager 115 may determine which virtual drives map to which physical SSDs and which portions of those SSDs the virtual drives map to. Once these configurations are determined, array manager 115 may send these configurations to the storage controllers 108A-N for implementation.

Array manager 115 additionally generates and manages a garbage collection schedule for the SSDs 150A-N. Array manager 115 may determine the garbage collection schedule based on a particular array configuration and/or based on information about the SSDs, such as maximum amounts of time for them to complete garbage collection operations. Based on this information array manager 115 may allocate a time window for each SSD 150A-N. The garbage collection schedule includes the garbage collection time windows for each SSD. Array manager 115 then notifies each of the SSDs 150A-N of their allotted time windows and additionally sends copies of the garbage collection schedule to the storage controllers 108A-N.

Each SSD 150A-N performs garbage collection operations during their allotted garbage collection time windows, and refrains from performing garbage collection operations outside of the allotted time windows. Accordingly, when a storage controller 108A-N receives a read command, it can use the garbage collection schedule to determine which, if any, SSDs 150A-N are undergoing garbage collection. Rather than waiting for an SSD to complete garbage collection, the storage controller 108A-N may retrieve data from other SSDs in the array and reconstruct data of the SSD performing garbage collection. This reconstructed data may then be used (potentially along with other data stored in the other SSDs) to satisfy the read request. This can significantly reduce the lag introduced by garbage collection operations of SSDs.

Host computing devices 104A-N may each include a physical machine and/or a virtual machine hosted by a physical machine. The physical machine may be a rack-mount server, a desktop computer, or other computing device. In one embodiment, one or more host computing device 104A-N includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-N may host one or more applications 135A, 135B through 135N. The applications 135A-N may be application servers, web servers, standalone applications, and so forth. Accordingly, host computing devices 104A-N may provide services to clients via applications 135A-N in some embodiments.

Each host computing device 104A-N may additionally mount or otherwise connect to one or more virtual drives 180A, 180B through 180N (e.g., one or more logical unit numbers (LUNs)). Though each host computing device 104A-N is shown to mount a different virtual drive 180A-N, different host computing devices may mount or connect to the same virtual drive. Each virtual drive 180A-N is a logical storage device that maps a logical storage address space to physical storage address spaces of multiple storage devices (e.g., solid state drives (SSDs) 150A, 150B, 150C through 150N of storage server 101). Additionally, a virtual drive 180A-N may map a logical storage address space to physical storage address spaces of storage devices on multiple different storage servers. As mentioned above, host computing devices 104A-N have access to data stored in the array of SSDs 150A-N with minimal lag even while one or more of the SSDs are undergoing garbage collection operations.

Figure 2A:
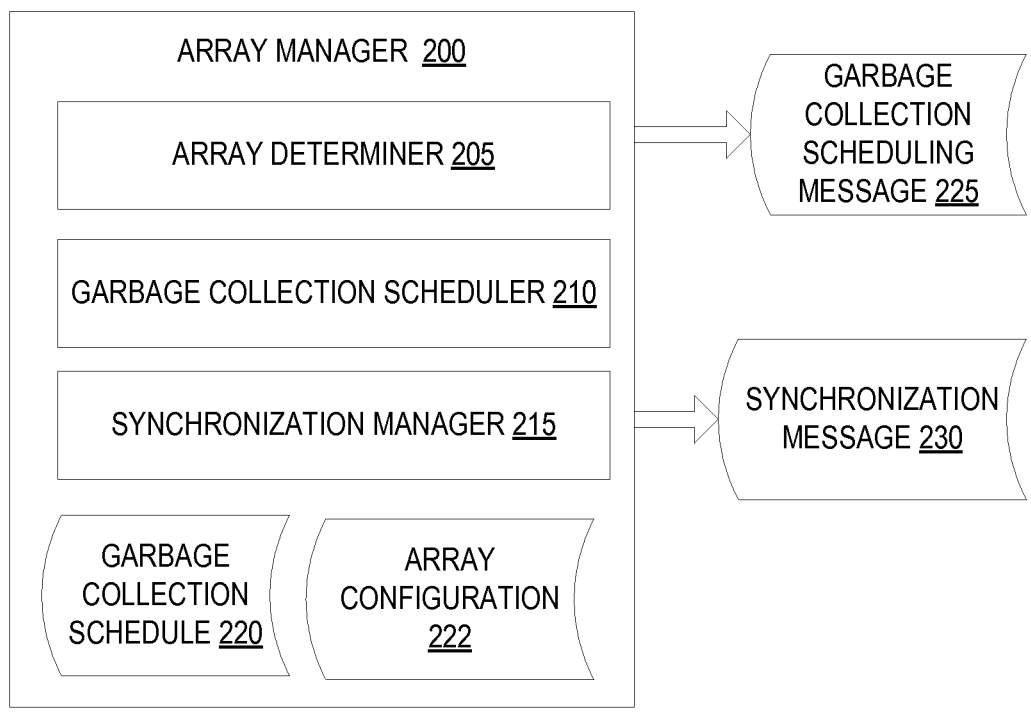
FIG. 2A is a block diagram of one embodiment of an array manager.

FIG. 2A is a block diagram of one embodiment of an array manager 200 showing logical modules that may be loaded into and executed by a processing device of array manager 200. Alternatively, array manager 200 may include one or more physical modules (e.g., an integrated circuit (IC) designed with described modules or a configurable logic such as a field programmable gate array (FPGA) configured to have the modules). In one embodiment, array manager 200 includes the modules of an array determiner 205, a garbage collection scheduler 210 and a synchronization manager 215. Alternatively, the functionality of the array determiner 205, garbage collection scheduler 210 and/or synchronization manager 215 may be divided into additional modules or may be combined into a single module. In one embodiment, array manager 200 corresponds to array manager 115 of FIG. 1.

Array determiner 205 identifies available storage devices and may determine how those storage devices are to be configured into an array, and may store such information as array configuration 222. Array determiner 205 additionally determines how to divide the array of storage devices into virtual drives, and this information may also be included in array configuration 222. Array determiner 205 may determine how many virtual drives to create, the sizes of those virtual drives, and what physical addresses of the storage devices to allocate to each virtual drive. Once the configurations for the virtual drives are determined, array determiner 205 sends the configurations to storage controllers. The storage controllers may then use the received configurations to establish and maintain the virtual drives.

Garbage collection scheduler 210 controls when each solid state storage device in an array is to perform garbage collection operations based on generation and propagation of a garbage collection schedule. To create a garbage collection schedule, garbage collection scheduler 210 may first for each storage device the maximum amount of time that is used by that storage device to complete garbage collection. Different storage device models may complete garbage collection operations in different time frames. Alternatively, some or all of the storage devices may have the same completion time for garbage collection.

Garbage collection scheduler 210 may additionally determine how the array of storage devices has been configured. In one embodiment, the array of storage devices are configured in a particular redundant array of independent disks (RAID) configuration. Different RAID configurations may have different levels of redundancy and/or parity. The level of redundancy and/or parity may be used to determine how many storage devices (and which storage devices) may undergo garbage collection operations in parallel.

Garbage collection scheduler 210 then allocates a garbage collection time window to each storage device based on the gathered information and generates a garbage collection schedule 220 that identifies all of the time windows as well as which storage devices those time windows are allocated to. The time window allocated to a storage device should be at least as large as the maximum time used by that storage device to perform garbage collection operations. Additionally, storage devices and storage controllers should be synchronized to ensure that they are all on the same schedule. However, clocks or counters of the different storage devices and/or storage controllers may drift over time, as is discussed in greater detail below. In one embodiment, each allocated time window is large enough to account for such drift. In one embodiment, a cushion of 1-2 milliseconds is provided, such that the time window allocated to a storage device is 1-2 milliseconds greater than the maximum amount of time used by that storage device to complete garbage collection.

In a first example, the storage devices are arranged in a RAID 0+1 type array. For a RAID 0+1 array configuration, a first half of the storage devices are arranged into a first striped set and a second half of the storage devices are arranged into a second striped set having a mirror relationship with the first striped set. Any of the storage devices in the first striped set may undergo garbage collection in parallel without impacting read or write delays so long as all of the storage devices in the second striped set are available. Similarly, any of the storage devices in the second striped set may undergo garbage collection in parallel without impacting read or write delays so long as all of the storage devices in the first striped set are available. Accordingly, the storage devices in the first striped set may be assigned the same first time window and the storage devices in the second striped set may be assigned the same second time window. Each storage device may independently determine within its allotted time windows whether to perform garbage collection. However, each storage device is prohibited from performing garbage collection outside of its allotted time windows.

In a second example, the storage devices are arranged into a RAID 4 type array, in which block level striping is performed across the storage devices with one or more dedicated parity disks. For a RAID 4 configuration having a single parity disk, no two storage devices are permitted to perform garbage collection operations in parallel. Accordingly, garbage collection scheduler 210 allocates a different time window to each storage device.

In a third example, the storage devices are arranged into a RAID 5 type array, in which block level striping is used and parity is distributed across the different storage devices. Similar to the RAID 4 type array, for a RAID 5 configuration no two storage devices are permitted to perform garbage collection operations in parallel. Accordingly, garbage collection scheduler 210 allocates a different time window to each storage device.

In a fourth example, the storage devices are arranged into a RAID 6 type array, in which block level striping is used with double distributed parity. The double parity provides fault tolerance for up to two unavailable storage devices. Accordingly, for a RAID 6 configuration two storage devices are permitted to perform garbage collection in parallel. Accordingly, garbage collection scheduler 210 divides the storage devices into pairs and allocates a different time window to each pair of storage devices.

Many other RAID configurations may be used, and a different appropriate garbage collection schedule may be generated for each type of RAID configuration. Additionally, erasure coding may be used instead of or in addition to a RAID configuration. For erasure coding, data containing k symbols is transformed into a longer message having n symbols such that the original message can be recovered from a subset of the n symbols. For an erasure coding configuration, k' denotes the number of symbols needed to recover the data. Accordingly, n–k' drives in an array may undergo garbage collection in parallel.

Once the garbage collection schedule is generated, array scheduler 200 sends a garbage collection scheduling message 225 to each storage device and to each storage controller. Garbage collection scheduling messages sent to storage controllers include an entire garbage collection schedule 220. A garbage collection scheduling message sent to a storage device includes the garbage collection time window allocated to that storage device.

In order for the garbage collection schedule 220 to function properly, the storage devices and storage controllers should ideally be synchronized. Synchronization manager 215 in one embodiment is responsible for maintaining such synchronization. Synchronization manager 215 may periodically send out synchronization messages 230 simultaneously or in parallel to each of the storage controllers and storage devices. The synchronization messages 230 may cause the storage devices and storage controllers to reset a counter or clock. Thus, even if these devices drift over time, the devices are periodically re-synchronized by sending out new synchronization messages. Other synchronization techniques may also be used to maintain synchronization between the storage devices and storage controllers.

Figure 7:
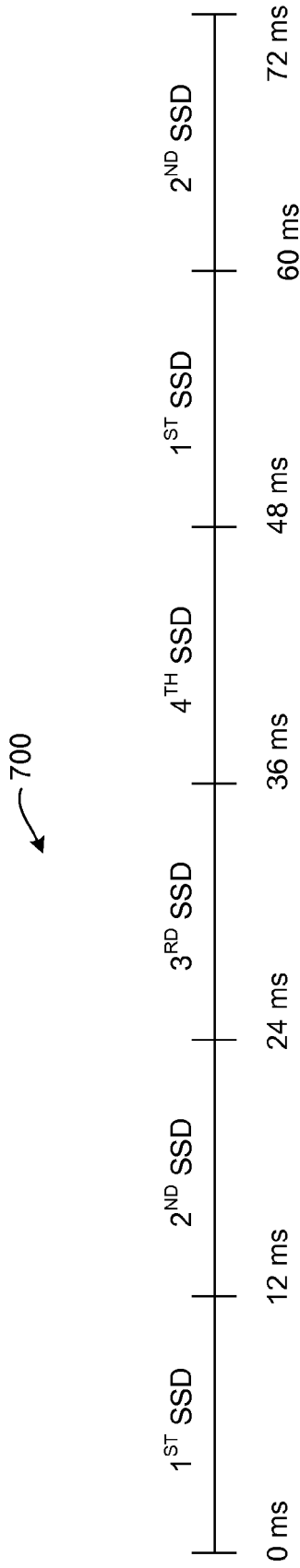
FIG. 7 illustrates an example garbage collection schedule, in accordance with one embodiment.

FIG. 7 illustrates an example garbage collection schedule 700, in accordance with one embodiment. The garbage collection schedule 700 is for an array of four SSDs (including a $1^{st}$ SSD, $2^{nd}$ SSD, $3^{rd}$ SSD and $4^{th}$ SSD) arranged in a RAID 4 or RAID 5 type configuration. Thus, no two SSDs have the same assigned garbage collection time window. The four SSDs in this example all have the same performance parameters, and each SSD completes garbage collection operations in under 10 milliseconds (ms). To account for drift between clocks of the different SSDs, an additional buffer of 2 ms is used. Accordingly, each SSD is assigned a different 12 ms time window in which to perform garbage collection operations. As shown, the first SSD is assigned a time window of 0-12 ms, the second SSD is assigned a time window of 12-24 ms, a third SSD is assigned a time window of 24-36 ms, and a fourth SSD is assigned a time window of 36-48 ms. The time windows then repeat, with the first SSD assigned a time window of 48-60 ms, the second SSD is assigned a time window of 60-72 ms, and so on. In some embodiments, there are time windows that are not assigned to any storage devices. For example, time windows may be assigned to the first through the fourth SSD for times of 0-48 ms, and for times of 48-96 ms no time windows are assigned to any of the SSDs.

Figure 2B:
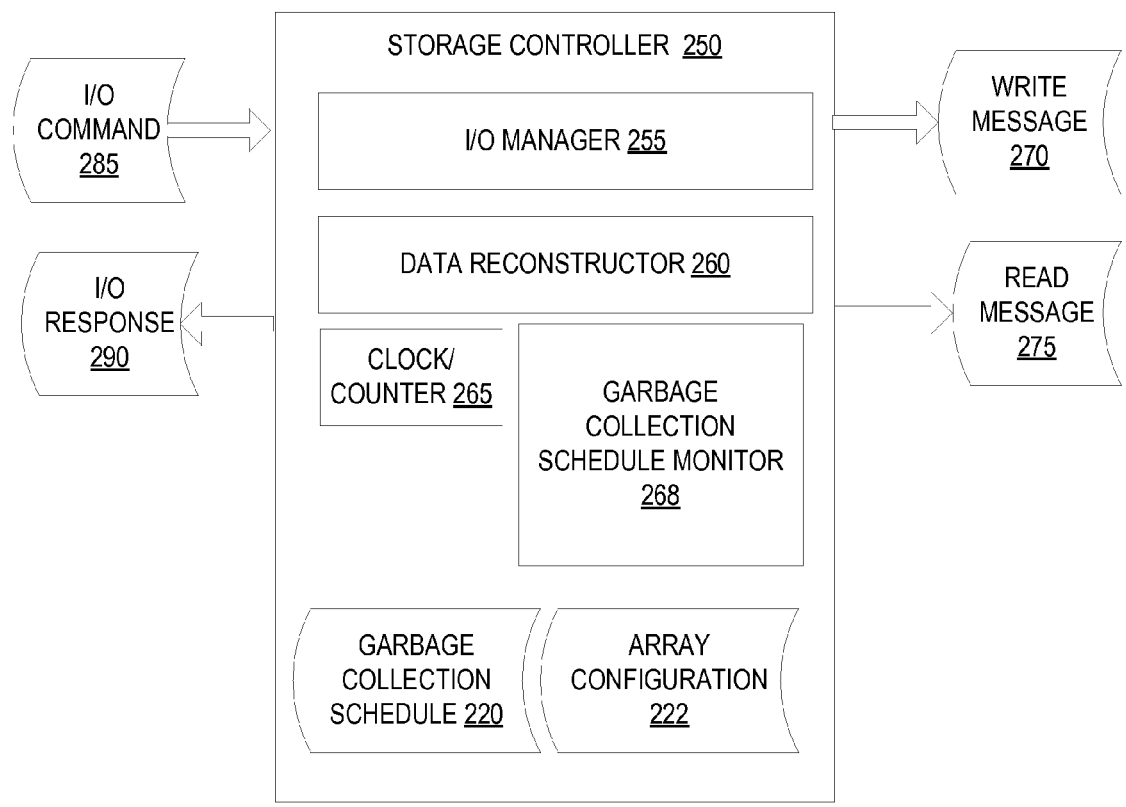
FIG. 2B is a block diagram of one embodiment of a storage controller.

FIG. 2B is a block diagram of one embodiment of a storage controller 250 showing logical modules that may be loaded into and executed by a processing device of storage controller 250. Alternatively, array manager 250 may include one or more physical modules (e.g., an integrated circuit (IC) designed with described modules or a configurable logic such as a field programmable gate array (FPGA) configured to have the modules). In one embodiment, storage controller 250 includes the modules of an input/output (I/O) manager 255, a data reconstructor 260 and a garbage collection schedule monitor 268. Alternatively, the functionality of the I/O manager 255, data reconstructor 260 and/or garbage collection schedule monitor 268 may be divided into additional modules or may be combined into a single module. In one embodiment, storage controller 250 corresponds to a storage controller 108A-N of FIG. 1.

I/O manager 255 is responsible for communicating with host computing devices and satisfying input/output (I/O) commands 285 such as read commands and write commands from the host computing devices. Responsive to receiving an I/O command, I/O manager 255 determines which storage devices to read data from or to write data to. I/O manager 255 may then issue a write message 270 to write data to one or more identified storage devices or a read message 275 to read data from the one or more identified storage devices. After data has been successfully written to the storage devices, I/O manager may send an I/O response 290 indicating that the data was written to the storage devices successfully. To respond to a read request, I/O manager 255 may retrieve data from the storage devices and transmit the retrieved data to the requesting host computing device in an I/O response 290.

In some instances, one or more of the storage devices storing data to be read are in a garbage collection mode when a read request is received. Similarly, one or more storage devices to which data is to be written may be in a garbage collection mode when a write request is received. Responsive to receipt of an I/O command such as a read command or write command, garbage collection schedule monitor 268 determines which, if any, storage devices are performing garbage collection operations. Garage collection schedule monitor 268 may make this determination by determining a current time or count based on a clock or counter 265 and checking the current time or count against a garbage collection schedule 220.

If garbage collection schedule monitor 268 determines that a storage device is in a garbage collection mode when a write command is received (e.g., by determining that a current clock reading or counter reading corresponds to a garbage collection time window assigned to a storage device), garbage collection schedule monitor 268 directs I/O manager 255 to temporarily store data associated with the write command in a memory of the storage controller 250 until the storage device exits the garbage collection mode. Garbage collection schedule monitor 268 may determine when the storage device will exit the garbage collection mode based on the garbage collection schedule. Once the garbage collection time window allocated to that storage device is terminated, the storage device will have completed all garbage collection operations. Accordingly, Garbage collection schedule monitor 268 may direct the I/O manager 255 to write the temporarily stored data to the storage device after the time window ends.

In one embodiment, if a storage device is in a garbage collection mode when a write command is received, I/O manager 255 writes some data to other storage devices that are not undergoing garbage collection. Once the garbage collection time window allocated to the storage device in the garbage collection mode ends, I/O manager 255 then stores the remaining data to that storage device. Alternatively, I/O manager 255 may additionally temporarily store the data portions that are to be written to the other storage devices that are not in garbage collection mode. Once the one (or few) storage devices in the garbage collection mode complete garbage collection, I/O manager 255 may then write the stored data to all of the storage devices, as appropriate.

If garbage collection schedule monitor 268 determines that a storage device is in a garbage collection mode when a read command is received, garbage collection schedule monitor 268 invokes data reconstructor 260. Data reconstructor 260 may use an array configuration 222 to determine which available storage devices (e.g., storage devices not performing garbage collection operations) in an array store parity information that may be used to reconstruct the desired data stored on the storage device that is in the garbage collection mode. Data reconstructor 260 may then retrieve data from the available storage devices in the array, and may use that data to reconstruct the data stored in the storage device undergoing garbage collection. Data reconstructor 260 may then provide this data to I/O manager 255. I/O manager 255 may additionally retrieve the rest of the requested data from the available storage devices in the array. I/O manager 255 may then return the requested data (including the reconstructed data) to the requestor. The garbage collection schedule 220 may have been set up such that there are always sufficient available storage devices to reconstruct data from any storage devices undergoing garbage collection. Thus, read commands may be satisfied with minimal delay even when one or more storage devices are performing garbage collection operations.

Reconstruction of data stored on storage devices undergoing garbage collection may take a few microseconds. Accordingly, in one embodiment garbage collection schedule monitor 268 determines how much time is remaining in a current garbage collection time window before calling data reconstructor 260. If the time remaining in the current garbage collection time window is greater than the time needed to reconstruct data, then garbage collection schedule monitor initiates data reconstructor 260. However, if the time remaining in the current garbage collection time window is less than the time used to reconstruct data, garbage collection schedule monitor 268 may direct I/O manager 255 to wait until the garbage collection time window is ended before reading data from the storage device to which the garbage collection time window is assigned.

Figure 3:
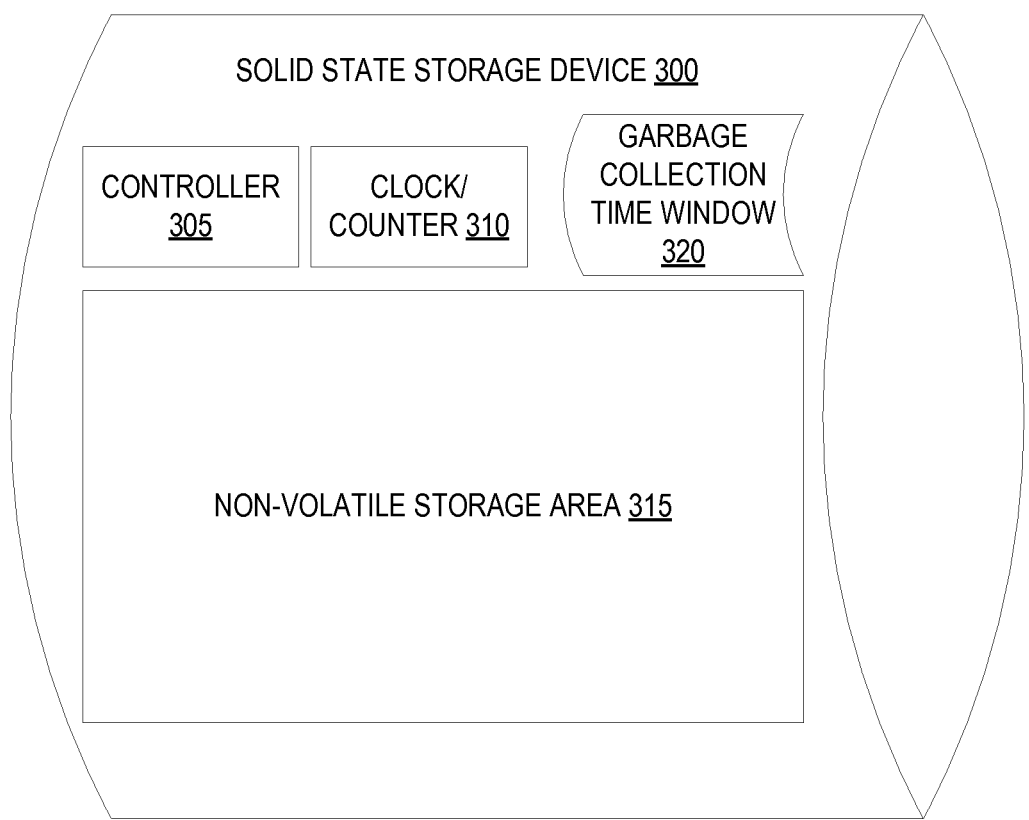
FIG. 3 is a block diagram of a solid state storage device that is configured to comply with an assigned garbage collection time window.

FIG. 3 is a block diagram of a solid state storage device 300 that is configured to comply with an assigned garbage collection time window 320. In one embodiment, solid state storage device 300 corresponds to SSDs 150A-N of FIG. 1. Solid state storage device 300 may include a controller 305, a clock or counter 310 and a non-volatile storage area 315. Controller 305 may be responsible for receiving I/O commands from remote devices (e.g., from a storage controller 108A-N of FIG. 1) and responding to such I/O commands. For example, controller 305 may write data to non-volatile storage area 315 and read data from non-volatile storage area 315.

Controller 305 may additionally include logic for performing garbage collection operations, as have previously been described. Controller 305 may receive a message from an array manager specifying a garbage collection time window 320. Controller 305 may then store the garbage collection time window 320 in a memory (e.g., a volatile or non-volatile memory) of solid state storage device 300. Controller 305 may wait until the assigned garbage collection time window 320 to perform garbage collection operations. Controller 305 may determine based on a count of the clock or counter 310 when an assigned garbage collection time window begins and ends.

At the start of the assigned garbage collection time window, solid state storage device 300 may determine whether garbage collection should be performed. This determination may be made, for example, by determining whether any blocks of the non-volatile storage area 315 include more than a threshold number of invalid memory pages. If more than the threshold number of memory pages in any block are invalid, then controller 305 may determine that garbage collection operations should be performed for that block. If this determination is made, then controller 305 performs garbage collection on the determined block or blocks during the garbage collection time window. Otherwise, controller 305 may determine not to perform any garbage collection operations during the garbage collection time window.

Figure 4:
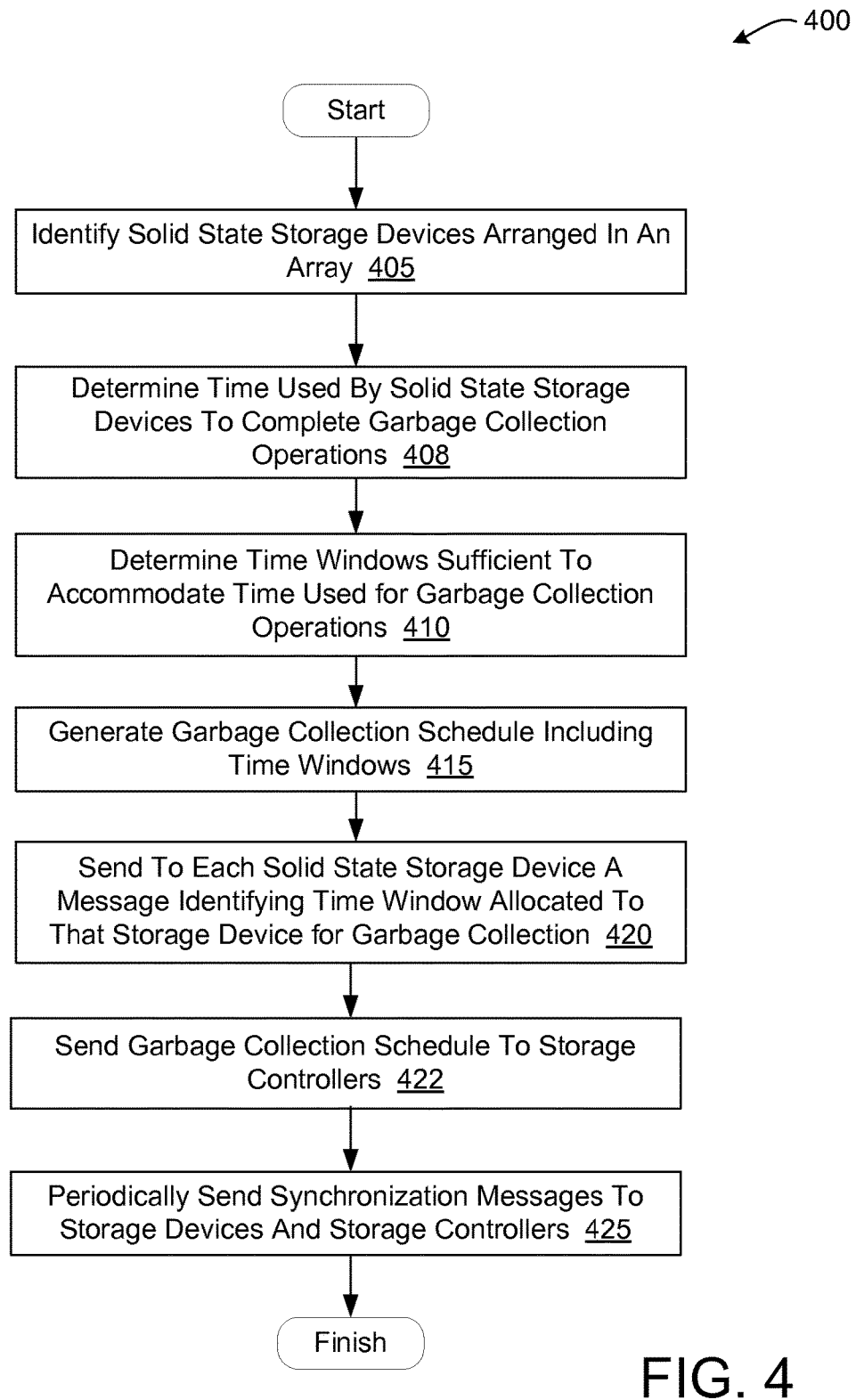
FIG. 4 is a flow diagram of one embodiment for a method of creating and distributing a garbage collection schedule for an array of solid state storage devices.
Figure 5:
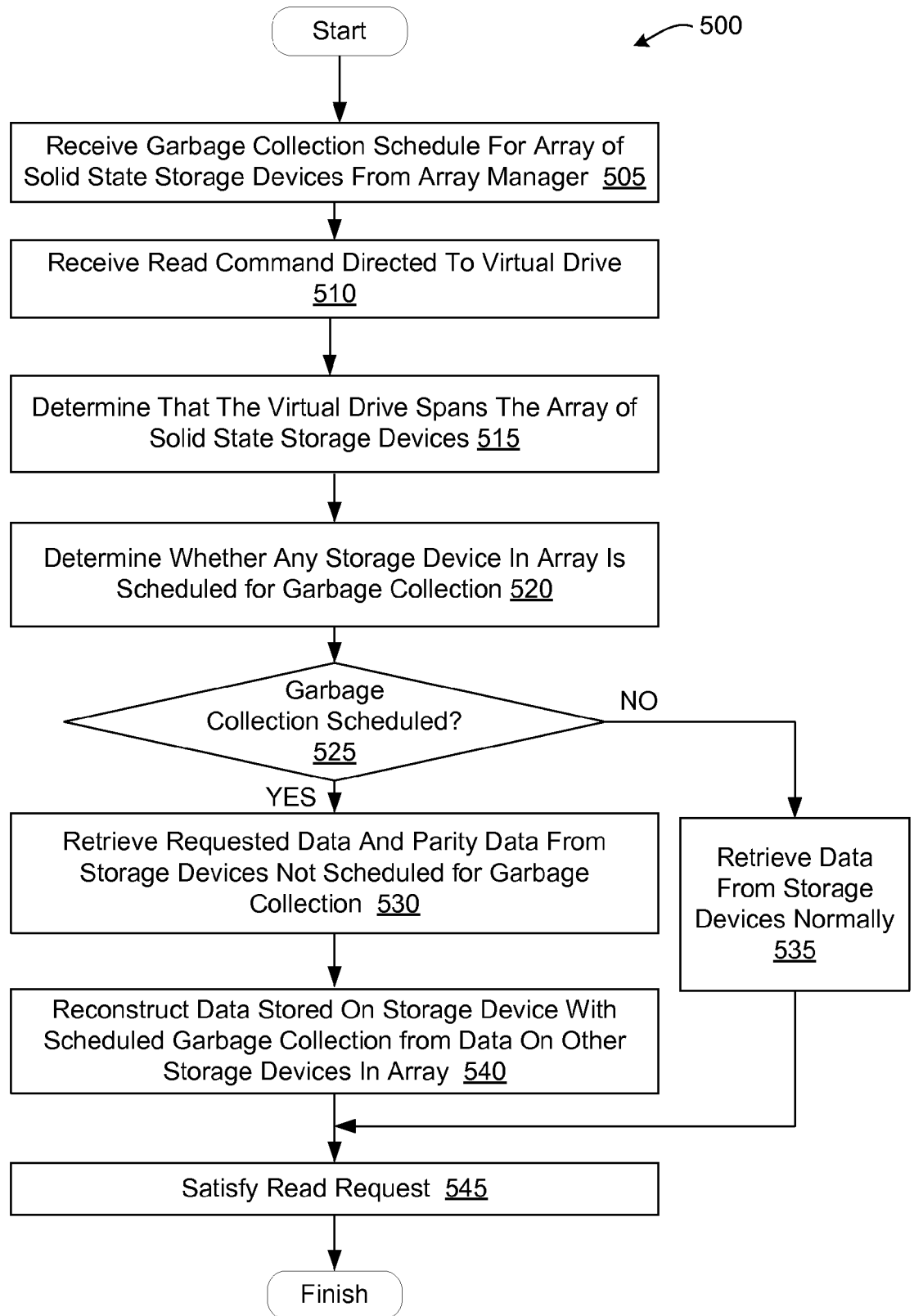
FIG. 5 is a flow diagram of one embodiment for a method of applying a garbage collection schedule to determine how to respond to read and write commands.
Figure 6:
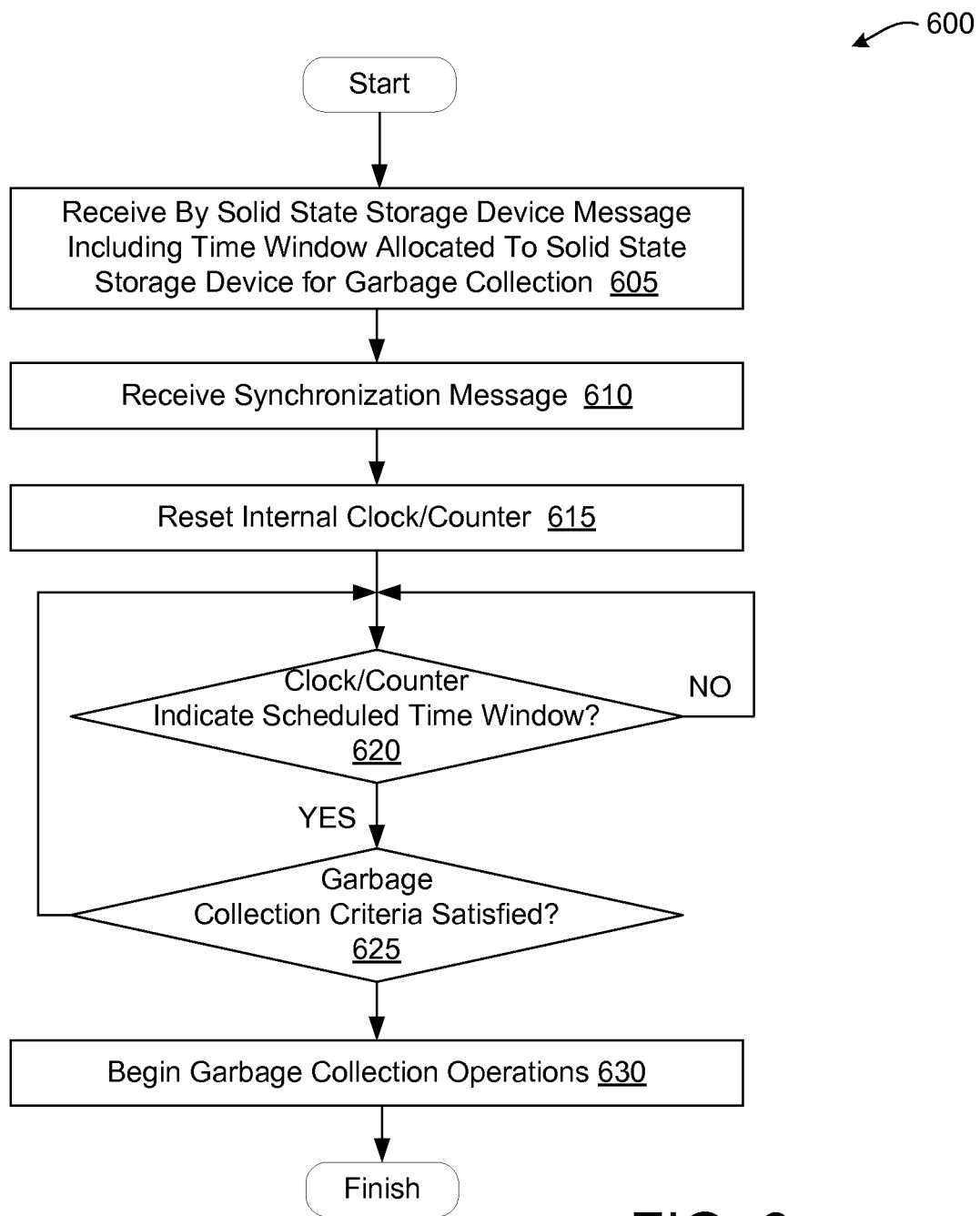
FIG. 6 is a flow diagram of one embodiment for a method of performing garbage collection operations according to a dictated garbage collection schedule.

FIGS. 4-6 are flow diagrams of various implementations of methods related to generating and applying a garbage collection schedule for an array of solid state storage devices. The methods are performed by processing logic that may include hardware (circuitry, dedicated logic, etc.), software (such as is run on a general purpose computer system or a dedicated machine), or a combination of both. Some methods may be performed by an array manager such as array manager 115 of FIG. 1. Some methods may be performed by a storage controller such as any storage controller 108A-N of FIG. 1. Some methods may be performed by a solid state storage device such as any solid state storage device 150A-N of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram of one embodiment for a method 400 of creating and distributing a garbage collection schedule for an array of solid state storage devices. Method 400 may be performed, for example, by an array manager. At block 405 of method 400, processing logic identifies solid state storage devices arranged into an array. At block 408, processing logic determines an amount of time used by the storage devices to complete garbage collection operations. In some instances, all of the storage devices may complete garbage collection operations in the same amount of time (e.g., if all of the solid state storage devices are of the same make and model). In other instances, different solid state storage devices may use different amounts of time to complete garbage collection operations.

At block 410, processing logic determines, for each solid state storage device, a time window that is sufficient for that storage device to complete garbage collection operations. The determined time window may be larger than the determined amount of time used to complete garbage collection operations by an estimated maximum time drift between clocks of storage devices in the array. In one embodiment, the determined time window is about 1-2 ms greater than the amount of time used to complete garbage collection operations.

At block 415, processing logic generates a garbage collection schedule including each of the determined time windows. At block 420, processing logic sends to each solid state storage device a message identifying a time window allocated to that storage device for garbage collection. At block 422, processing logic sends copies of the garbage collection schedule to one or more storage controllers that will manage interaction with the storage devices.

At block 425, processing logic periodically sends synchronization messages to the storage devices and to the storage controllers. The clocks and/or counters of the storage devices and storage controllers may operate at slightly different speeds. Accordingly, over time clocks and/or counters of these storage devices and storage controllers may drift apart. To correct for such drift, processing logic periodically sends the synchronization messages. A synchronization message may be broadcast or multicast to each storage controller and storage device in a storage server (and/or to storage controllers and storage devices in other storage servers). Alternatively, processing logic may generate multiple synchronization messages, and send these messages simultaneously to each of the storage controllers and storage devices. Each of the storage controllers and storage devices may reset a count on a clock, counter or timer responsive to receipt of the synchronization message, thus resynchronizing them.

FIG. 5 is a flow diagram of one embodiment for a method 500 of applying a garbage collection schedule to determine how to respond to read and write commands. At block 505 of method 500, processing logic receives a garbage collection schedule for an array of solid state storage devices (e.g., from an array manager). Processing logic may then store the garbage collection schedule in memory.

At block 510, processing logic receives a read command directed to a storage location on a virtual drive. At block 515, processing logic determines that the virtual drive spans the array of solid state storage devices. At block 520, processing logic determines whether any storage devices in the array of solid state storage devices is scheduled for garbage collection. In one embodiment, processing logic additionally determines whether the storage device is actively performing garbage collection. This may be to account for instances in which garbage collection is scheduled but no garbage collection actually occurs.

At block 525, if any storage devices is scheduled for garbage collection (or is detected to be performing garbage collection), the method continues to block 530. If at block 525 it is determined that no storage devices are scheduled for garbage collection (or no storage devices are actively performing garbage collection), the method proceeds to block 535, and requested data is retrieved from the array of storage devices normally.

At block 530, processing logic retrieves the requested data from the other storage devices not scheduled for garbage collection. Processing logic additionally retrieves parity data from the other storage devices not scheduled for garbage collection. At block 540, processing logic reconstructs data stored on the storage device with the scheduled garbage collection time window from the retrieved data and parity data.

At block 545, processing logic satisfies the read request with the retrieved data. The method then ends.

FIG. 6 is a flow diagram of one embodiment for a method 600 of performing garbage collection operations according to a dictated garbage collection schedule. Method 600 is performed by a solid state storage device such as a Flash solid state storage device. At block 605 of method 600, processing logic for the solid state storage device receives a message including identification of one or more time windows allocated to the solid state storage device for garbage collection. Processing logic may then store the time window(s) in memory.

At block 610, processing logic receives a synchronization message. The synchronization message may have been sent to the solid state storage device at approximately the same time that the synchronization message was sent to other solid state storage devices and storage controllers. At block 615, processing logic resets an internal clock or counter responsive to the synchronization message. Alternatively, processing logic may set the clock or counter to a count designated in the synchronization message.

At block 620, processing logic determines whether the clock or counter indicates a time or count that corresponds to a time window allocated to the storage device. If so, the method continues to block 625. Alternatively, block 625 may be skipped and the method may proceed directly to block 630. If the clock or counter indicates that the time or count does not correspond to a time window allocated to the storage device, the method returns to block 620.

At block 625, processing logic determines whether one or more garbage collection criteria are satisfied. In one embodiment, processing logic determines whether any blocks of the solid state storage device have a number of invalid memory pages that meet or exceed a threshold. If the one or more garbage collection criteria are satisfied, the method continues to block 630. If the one or more garbage collection criteria are not satisfied, the method returns to block 620 to wait for a next allocated time window.

At block 625, processing logic performs garbage collection operations such as identifying a block to be erased, writing contents of valid memory pages in that block to another block, and erasing the memory pages in that block. Once the garbage collection operations are complete, the method may return to block 620 to wait for a next assigned time window.

The modules, components and other features described herein (for example in relation to FIGS. 2A-2B) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "determining", "receiving", "sending", "identifying" or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the computing device that cause the computing device to perform any one or more of the methodologies of the present invention. The term "computer-readable storage medium" shall accordingly be taken to include, but not be limited to, non-transitory media such as solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processing device, a plurality of solid state storage devices arranged in an array;
   determining, using configuration information associated with the array, a maximum number of solid state storage devices of the plurality of solid state storage devices that can perform garbage collection operations in parallel without impacting read or write access times to the array;
   determining, by the processing device, for a first set of solid state storage devices of the plurality of solid state storage devices, a first time window during which the first set of solid state storage devices is permitted to perform a first garbage collection operation;

determining, by the processing device, for a second set of solid state storage devices of the plurality of solid state storage devices, a second time window during which the second set of solid state storage devices is permitted to perform a second garbage collection operation, wherein the second time window is different from the first time window, and wherein the second time window does not begin until after the first time window ends;

sending, by the processing device, to the first set of solid state storage devices, a first message comprising the first time window allocated to the first set of solid state storage devices, wherein the first set of solid state storage devices is to perform the first garbage collection operation during the first time window allocated to the first set of solid state storage devices; and sending, by the processing device, to the second set of solid state storage devices, a second message comprising the second time window allocated to the second set of solid state storage devices, wherein the second set of solid state storage devices is to perform the second garbage collection during the second time window allocated to the second set of solid state storage devices;

wherein the first and second set of solid state storage devices each comprises a number of solid state storage devices equal to or less than the determined maximum number of solid state storage devices of the plurality of solid state storage devices that can perform garbage collection operations in parallel.

2. The method of claim 1, wherein a storage controller is to provide a virtual drive comprising at least a portion of each of the plurality of solid state storage devices to one or more host devices.

3. The method of claim 1, further comprising:
determining a garbage collection schedule for the plurality of solid state storage devices, wherein determining the garbage collection schedule comprises determining, for each solid state storage device of the plurality of solid state storage devices, a particular time window during which that solid state storage device is permitted to perform one or more garbage collection operations; and sending, to each solid state storage device of the plurality of solid state storage devices, a message comprising the particular time window allocated to that solid state storage device, wherein each solid state storage device is to perform the one or more garbage collection operations during the time window allocated to that solid state storage device.

4. The method of claim 3, wherein data is readable from the plurality of solid state storage devices during each particular time window.

5. The method of claim 3, wherein each particular time window is offset from each other particular time window such that no two particular time windows are overlapping.

6. The method of claim 3 further comprising:
sending a synchronization message to the plurality of solid state storage devices.

7. The method of claim 1, wherein the array comprises a redundant array of independent disks (RAID) configuration, and wherein during the first time window data stored on the first set of solid state storage devices may be reconstructed from other solid state storage devices of the plurality of solid state storage devices responsive to a read command.

8. The method of claim 7, wherein determining the maximum number of solid state storage devices that can perform garbage collection operations in parallel comprises determining a number of parity drives for the RAID configuration.

9. The method of claim 1, wherein the plurality of solid state storage devices comprise a plurality of Flash storage devices.

10. A computing device comprising:
a memory; and
a processing device coupled to the memory, the processing device to:
receive a garbage collection schedule for a plurality of solid state storage devices in an array, wherein the garbage collection schedule comprises, for each solid state storage device of the plurality of solid state storage devices, a particular time window during which that solid state storage device is permitted to perform one or more garbage collection operations, and wherein the garbage collection schedule has been determined using a configuration associated with the plurality of solid state storage devices in the array that indicates a maximum number of solid state storage devices that can perform garbage collection operations in parallel without impacting read or write access times to the array, and wherein the particular time window comprises a time period during which garbage collection operations may be performed by a number of solid state storage devices in the array equal to or less than the indicated maximum number;
receive a read command directed to a virtual drive that comprises at least a portion of each of the plurality of solid state storage devices;
determine that a first solid state storage device of the plurality of solid state storage devices is performing the one or more garbage collection operations based on the garbage collection schedule;
reconstruct data stored on the first solid state storage device from other solid state storage devices of the plurality of solid state storage devices, wherein data reconstruction for the data stored on the first solid state storage device is performed without sending any read command to the first solid state storage device; and
satisfy the read command using the reconstructed data.

11. The computing device of claim 10, wherein the processing device is further to:
receive a synchronization message that synchronizes the processing device to the plurality of solid state storage devices; and
set at least one of a counter or a clock responsive to receipt of the synchronization message.

12. The computing device of claim 10, wherein the processing device is further to:
receive a write command directed to the virtual drive while the first solid state storage device is performing the one or more garbage collection operations;
temporarily store the data from the write command in the memory until a time window allocated to the first solid state storage device is ended; and
after the time period is ended, write the data to the first solid state storage device.

13. The computing device of claim 10, wherein the plurality of solid state storage devices comprise a plurality of Flash storage devices.

14. A non-transitory computer readable storage medium having instructions that, when executed by a processing device, cause the processing device to perform operations comprising:

identifying, by the processing device, a plurality of solid state storage devices arranged in an array;

determining, using configuration information associated with the array, a maximum number of solid state storage devices of the plurality of solid state storage devices that can perform garbage collection operations in parallel without impacting read or write access times to the array;

determining, by the processing device, for a first set of solid state storage devices of the plurality of solid state storage devices, a first time window during which the first set of solid state storage devices is permitted to perform a first garbage collection operation;

determining, by the processing device, for a second set of solid state storage devices of the plurality of solid state storage devices, a second time window during which the second set of solid state storage devices is permitted to perform a second garbage collection operation, wherein the second time window is different from the first time window, and wherein the second time window does not begin until after the first time window ends;

sending, by the processing device, to the first set of solid state storage devices, a first message comprising the first time window allocated to the first set of solid state storage devices, wherein the first set of solid state storage devices is to perform the first garbage collection operation during the first time window allocated to the first set of solid state storage devices; and sending, by the processing device, to the second set of solid state storage devices, a second message comprising the second time window allocated to the second set of solid state storage devices, wherein the second set of solid state storage devices is to perform the second garbage collection during the second time window allocated to the second set of solid state storage devices;

wherein the first and second set of solid state storage devices each comprises a number of solid state storage devices equal to or less than the determined maximum number of solid state storage devices of the plurality of solid state storage devices that can perform garbage collection operations in parallel.

15. The non-transitory computer readable storage medium of claim 14, the operations further comprising:

determining a garbage collection schedule for the plurality of solid state storage devices, wherein determining the garbage collection schedule comprises determining, for each solid state storage device of the plurality of solid state storage devices, a particular time window during which that solid state storage device is permitted to perform one or more garbage collection operations; and sending, to each solid state storage device of the plurality of solid state storage devices, a message comprising the particular time window allocated to that solid state storage device, wherein each solid state storage device is to perform the garbage collection operations during the time window allocated to that solid state storage device.

16. The non-transitory computer readable storage medium of claim 15, wherein data is readable from the plurality of solid state storage devices during each particular time window.

17. The non-transitory computer readable storage medium of claim 15, wherein:

each particular time window is offset from each other particular time window such that no two particular time windows are overlapping; and the garbage collection operations have a maximum completion time, and each particular time window is greater than the maximum completion time.

18. The non-transitory computer readable storage medium of claim 15, further comprising:

periodically sending a synchronization message to the plurality of solid state storage devices.

19. The non-transitory computer readable storage medium of claim 14, wherein the array comprises a redundant array of independent disks (RAID) configuration, and wherein during the first time window data stored on the set of first solid state storage devices may be reconstructed from other solid state storage devices of the plurality of solid state storage devices responsive to a read command.

20. A storage server comprising:

a plurality of solid state storage devices arranged in an array, wherein the array is configured as a redundant array of independent disks (RAID);

an input/output (IO) controller, and a management controller coupled to the array, the management controller to:

determine, using RAID configuration information associated with the array, a maximum number of solid state storage devices of the plurality of solid state storage devices that can perform garbage collection operations in parallel without impacting read or write access times to the array;

determine, for a first set of solid state storage devices of the plurality of solid state storage devices, a first time window during which the first set of solid state storage devices is permitted to perform a first garbage collection operation;

determine, for a second set of solid state storage devices of the plurality of solid state storage devices, a second time window during which the second set of solid state storage devices is permitted to perform a second garbage collection operation, wherein the second time window is different from the first time window, and wherein the second time window does not begin until after the first time window ends;

send, to the first set of solid state storage devices, a first message comprising the first time window allocated to the first set of solid state storage devices, wherein the first set of solid state storage devices is to perform the first garbage collection operation during the first time window allocated to the first set of solid state storage devices; and send, to the second set of solid state storage devices, a second message comprising the second time window allocated to the second set of solid state storage devices, wherein the second set of solid state storage devices is to perform the second garbage collection operation during the second time window allocated to the second set of solid state storage devices;

wherein the first and second set of solid state storage devices each comprises a number of solid state storage devices equal to or less than the determined maximum number of solid state storage devices of the plurality of solid state storage devices that can perform garbage collection operations in parallel.

21. The storage server of claim 20, wherein determining the number of solid state storage devices that can perform garbage collection operations in parallel comprises determining a number of parity drives for the RAID configuration.

* * * * *